June 26, 1934.  H. D. GEYER  1,964,431
FREEZING TRAY
Filed Nov. 25, 1931

Inventor
Harvey D. Geyer
By Spencer Hardman & Fehr
his Attorneys

Patented June 26, 1934

1,964,431

UNITED STATES PATENT OFFICE 1,964,431

FREEZING TRAY

Harvey D. Geyer, Dayton, Ohio, assignor, by mesne assignments, to General Motors Corporation, Detroit, Mich., a corporation of Delaware Application November 25, 1931, Serial No. 577,251

4 Claims. (Cl. 62—108.5)

This invention relates to molds for freezing liquids, especially such as ice trays for use in domestic refrigerators.

An object of this invention is to provide an improved form of flexible non-metallic tray, such as molded flexible rubber, reinforced by a metal support or carrier, which metal carrier is permanently and simply attached to the flexible tray after it is molded. It is thus unnecessary to provide any molded in situ metal parts in the molded tray and hence the cost of manufacture thereof is substantially lessened.

Another object is to provide a very simple, efficient, and economically made metal carrier for the molded flexible tray.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
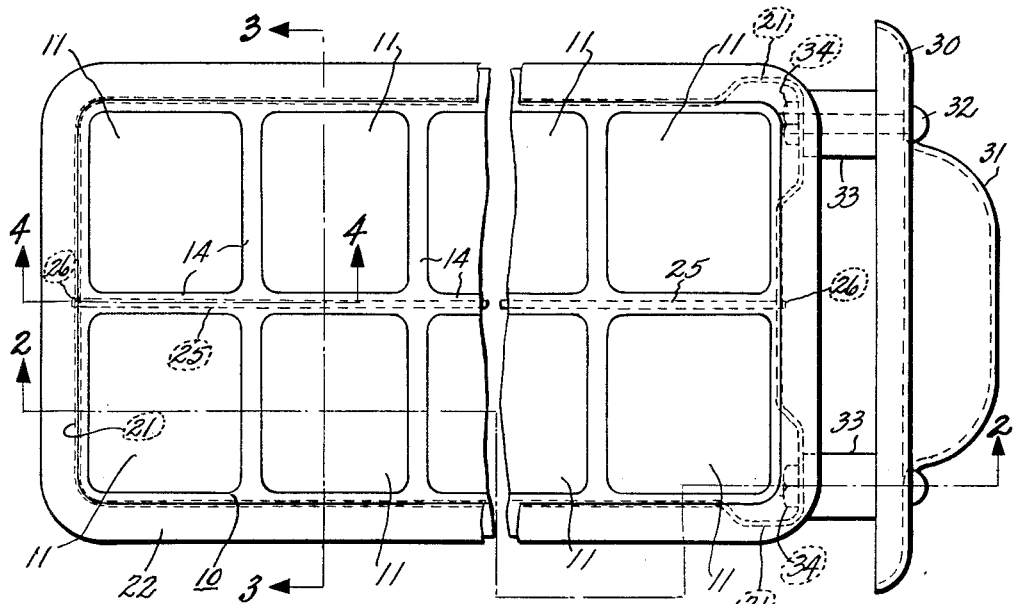
Fig. 1 is a plan view, part of its length being broken away, of an ice tray made according to this invention.

Numeral 10 designates as a whole a molded flexible non-metallic tray which is preferably molded in one piece from soft flexible rubber. The rubber tray here shown is molded with a plurality of separate ice-block pockets 11 which have their adjacent walls 12 spaced apart to provide cold air circulating spaces 13 therebetween whereby to obtain more rapid freezing. The side walls 12 of two adjacent pockets 11 are connected or molded integral at their adjacent upper edges at the junction 14, as clearly shown. The molded tray is also provided with a slightly thickened flanged bead 15 around its upper marginal edge. A tray, as thus molded, would not retain its shape when filled with water to be frozen and hence a metal frame or carrier 20 is provided therefor to retain its shape and facilitate its handling.

Figure 2:
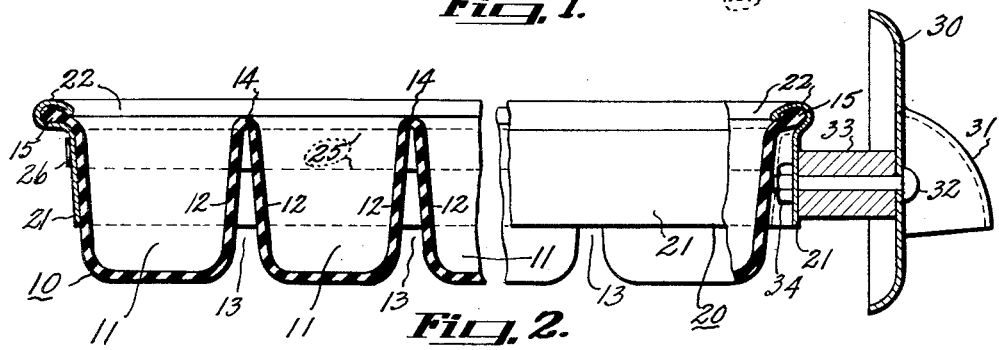
Fig. 2 is a section taken on line 2—2 of Fig. 1.
Figures 3, 4:
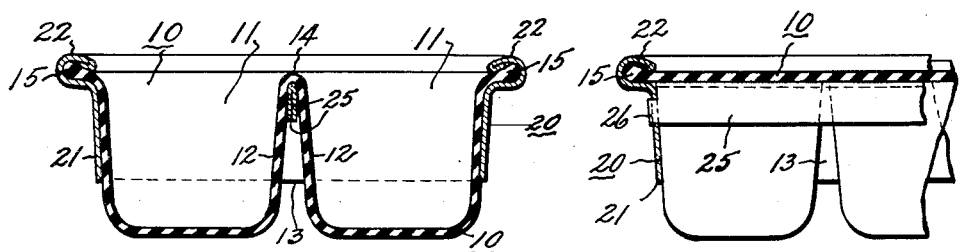
Fig. 3 is a section taken on line 3—3 of Fig. 1.
Fig. 4 is a section taken on line 4—4 of Fig. 1.

This carrier 20 comprises a sheet metal band 21 which fits snugly around the outer side walls of the molded rubber tray 10 and is permanently fixed thereto around its upper margin by having its upper marginal edge 22 shaped to conform to the flanged rubber bead 15 and is crimped thereupon to secure said bead 15 in place when the flexible ice pockets 11 are turned partially inside out to remove the frozen ice blocks. In addition to supporting the rubber tray around its upper margin, as above described, it is necessary or at least preferable to support the rubber at the junction 14 between the longitudinal rows of pockets 11. For this purpose, the thin sheet metal strip 25 is provided which has its two ends 26 inserted through suitable apertures in the end walls of the metal band 21, whereby it is made rigid with the metal carrier 20. The flexible rubber at junction 14 simply overlies and rests upon the supporting metal strip 25 and may be easily lifted therefrom. It will now be clear that when it is desired to remove frozen ice blocks from the tray that the central portion of the rubber tray may be forced upwardly by pressing the fingers on the bottom thereof, or the rubber tray may be easily turned partially or entirely inside out to release the frozen ice blocks. The marginal beads 15 of course are held in place in the metal carrier 20 during this manipulation and so after the ice blocks are all or in part removed from the tray, the rubber tray 10 will snap back into its illustrated position in the metal carrier due to its own resiliency. It is then filled with water for a second freezing. In the form shown in the drawing there are only two longitudinal rows of ice pockets 11 and hence only one strip 25, but of course if there are more than two such longitudinal rows a similar supporting strip 25 is provided between each pair of longitudinal rows of ice pockets 11 in order to give proper support to the central portion of the flexible tray 10. The relatively short transverse junction lines 14, shown in Fig. 2, will ordinarily be sufficiently self-supporting as not to require any metal support thereunder, and the omission of such transverse supports will greatly facilitate the above described operation of removing the frozen ice blocks.

For the purpose of providing better circulation of cooling air in the spaces 13 in between the ice pockets 11 the metal band 21 is not given the full depth of the rubber tray 10 but is shortened to leave roughly the lower third of the depth of tray 10 entirely unencased. This leaves a clear and unrestricted passage of the cooling air through the spaces 13. Also with this structure the bottoms of the ice pockets 11 may be more easily pushed upward with the fingers when removing the frozen contents.

The closure front 30 and handle 31 are formed from sheet metal and rigidly attached in spaced relation to the metal carrier 20 by the two bolts 32 and spacer tubes 33. In order to provide clearance for the nuts 34 the metal band 21 is shaped outwardly at the points of attachment of bolts 32, as clearly shown in Fig. 1.

While the form of embodiment of the present invention as herein disclosed, constitutes a preferred form, it is to be understood that other forms might be adopted, all coming within the scope of the claims which follow.

What is claimed is as follows:

1. A freezing tray comprising: a one piece flexible non-metallic container having ice-block compartments therein and having an outwardly projecting marginal flange around its upper edge, and a bottomless carrier frame therefor comprising a flat metal band surrounding and fitting snugly upon the outer side walls of said flexible container to form a support therefor, said metal band having its upper edge permanently secured to said marginal flange by mechanical means after said non-metallic container is completely formed.

2. A freezing tray comprising: a one piece flexible non-metallic container having ice-block compartments therein and having a marginal flange around its upper edge, and a flat metal band surrounding and fitting snugly upon the outer side walls of said flexible container to form a support therefor, said metal band having its upper edge permanently secured to said marginal flange, by being crimped thereover in such manner as to permit said flexible container to be turned inside out by the flexing of said flange.

3. A freezing tray comprising: a one piece flexible non-metallic container having ice-block compartments therein having air passages therebetween and having a marginal flange around its upper edge, and a bottomless carrier frame for said container comprising a flat metal band surrounding and fitting snugly upon the outer side walls of said flexible container and attached to said flange, said metal band extending downward from said marginal flange to a point substantially short of the bottom thereof whereby to permit better cold air circulation between said ice-block compartments.

4. A freezing tray comprising: a molded flexible rubber container having two rows of spaced ice-block pockets therein connected at their upper edges forming a one-piece construction, a flat metal band surrounding and fitting snugly upon the upper portion of the outer side walls of said rubber container and having its upper edge attached to the marginal upper edge of said rubber container, and a metal support fixed to said band and extending between said two rows of pockets and loosely supporting said pockets at their junction whereby said flexible pockets may be lifted upwardly or partially turned inside out to remove the frozen contents.

HARVEY D. GEYER.